Aug. 12, 1969     J. G. BOYD     3,460,273
EDUCATIONAL DEVICE
Filed May 8, 1967
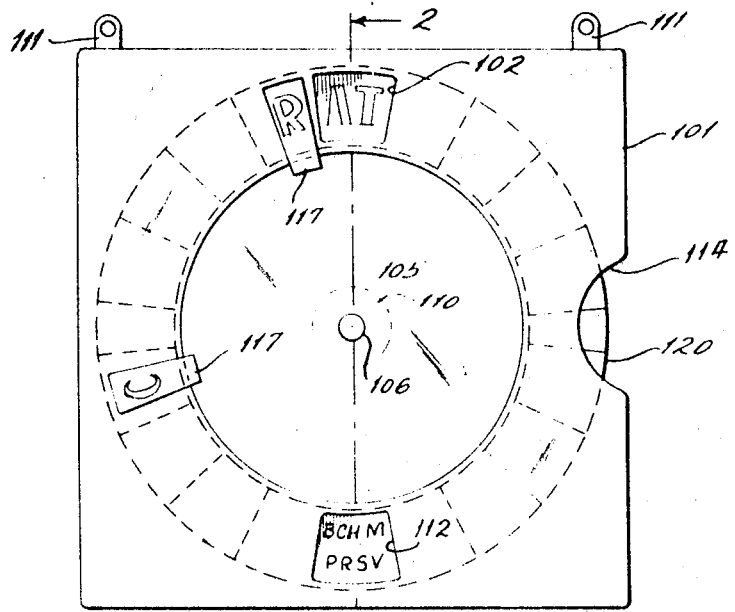
FIG.1
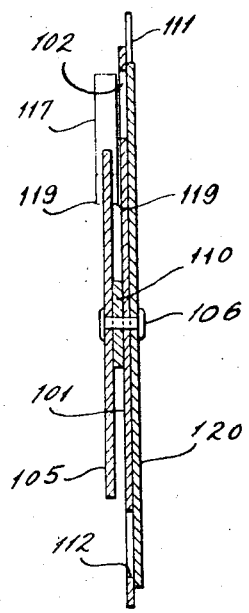
FIG.2
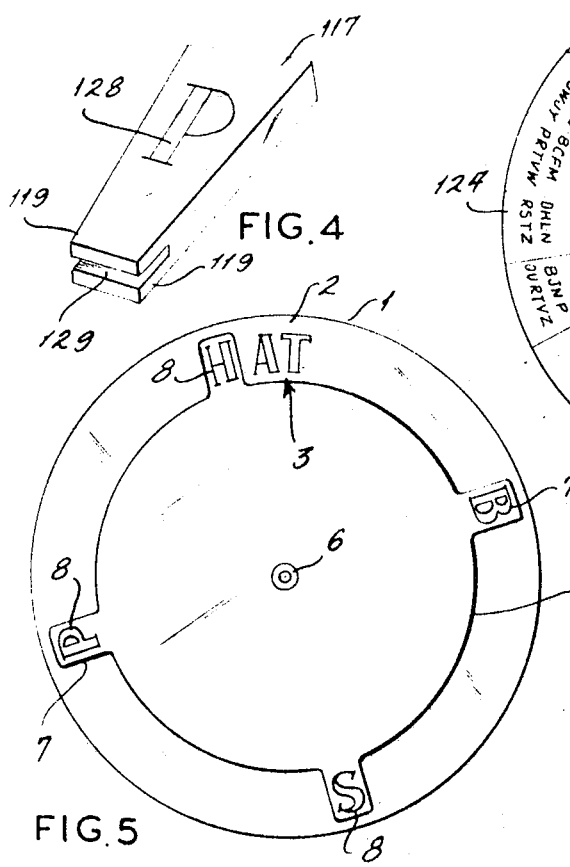
FIG.4
FIG.5
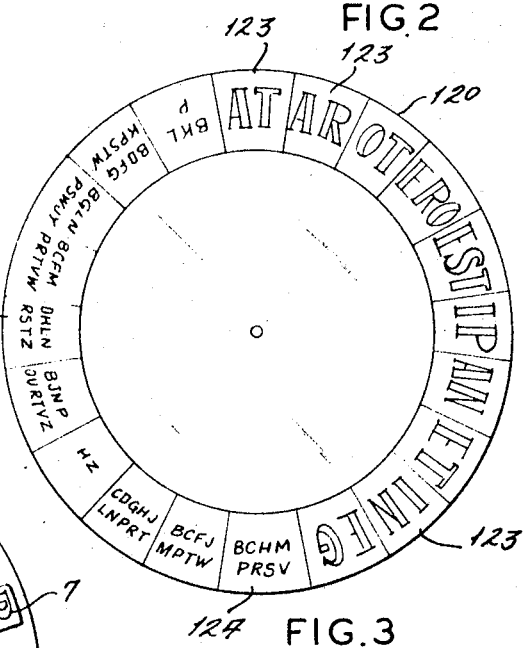
FIG.3
INVENTOR:
JOHNYE G BOYD
ATTORNEY 3,460,273
EDUCATIONAL DEVICE
Johnye G. Boyd, 3335 N. Euclid,
St. Louis, Mo. 63115
Filed May 8, 1967, Ser. No. 636,943
Int. Cl. G09b 21/00, 19/00
U.S. Cl. 35—35                                6 Claims

ABSTRACT OF THE DISCLOSURE

A fixed board has a phonic word family station at which a phonic word family or word segment is displayed. A movable consonant carrier is arranged to move individual consonants, consonant digraphs or consonant blends through a path over which the consonant or consonant blend is exposed for a substantial distance, to a position at which it forms with the phonic word family a complete word. In a simple illustrative example, the phonic word family is demountably and remountably attached to a board, and consonants are mounted to project radially outwardly of a revolvably mounted wheel, preferably at quadrants.

Background of the invention

After beginning pupils have learned the names of the letters of the alphabet and the sounds that letters and letter-combinations make, they are sometimes unable to master the consonant-substitution skill which would permit them to pronounce and learn for themselves phonetically related words previously unknown to them. Many children reach school age and begin school with little or no motivation, parental encouragement, or background for formal education, including reading. Even well motivated children have a limited attention span. The commonly suggested textbook guides toward teaching consonant substitution skill involve interruption or hesitation between successive substitutions of consonants.

One of the objects of this invention is to provide an educational device by which consonant substitution skill can be increased, which will aid in helping children to read independently and comprehend what they read and thus to increase the value and pleasure of their reading, which will hold the attention of even small children, and which is simple, economical, durable, and flexible in its application.

Other objects will become apparent to those skilled in the art in the light of the following description and accompanying drawing.

Summary of the invention

In accordance with this invention, generally stated, an educational device is provided which includes a phonic word family station, a phonic word family dislayed at the station, and a movable consonant carrier, having a part adjacent the station, for moving a plurality of consonants successively individually into position to form a word with the phonic word family. The consonants are spaced a sufficient distance apart along the carrier to remain unobtrusive as the consonant carrier moves any one consonant into position. The term "consonant" is used hereinafter to encompass single consonants, digraphs and blends. The successive consonants are, however, exposed to view through a substantial distance of travel as they approach the phonic word family station. In the preferred embodiments shown and described, there is a single station, and the consonant is brought into position through a considerable distance of exposed travel. This permits a child to anticipate the approach of the consonant and to think about what complete word will be formed, before the consonant reaches and passes the critical place in the complete word, and the excitement of the progress of the consonant toward its proper position holds the attention of the little children for whom the device is designed.

In the simplest illustrative embodiment, a board which is intended to remain fixed with respect to the viewer has a phonic word family removably mounted on it, and a wheel with four equi-positioned outwardly radially projecting integral tabs each with a consonant removably mounted on it. It has been found that having more than one phonic word family station is distracting to small children, and that having more than four consonants, except on a very large wheel, is also confusing, and that any such confusion leads to a loss of attention.

In the preferred embodiment, provision is made for an easy substitution of phonic word families or word segments, and a small, undistracting information station is provided at which suitable consonants are suggested for the teacher's benefit.

Brief description of the drawing

In the drawing, FIGURE 1 is a view in front elevation of one illustrative embodiment of educational device of this invention;

FIGURE 2 is a sectional view taken along the line 2—2 of FIGURE 1;

FIGURE 3 is a view in front elevation of a phonic word family carrier part of the device shown in FIGURES 1 and 2;

FIGURE 4 is a view in perspective of one consonant mounting tab, unmounted; and

FIGURE 5 is a view in front elevation of a simple embodiment of educational device of this invention.

Description of the preferred embodiments

Referring now to FIGURE 5 of the drawing for a simple but highly effective embodiment of educational device of this invention, reference numeral 1 indicates a board which is intended to remain in fixed position relative to the viewer. The board 1 has at its upper edge area a phonic word family station 2 on which a phonic word family 3, in the illustrative embodiment shown, "AT," is mounted.

A consonant carrier wheel 5 is revolvably mounted on a pin 6, on the board 1. The wheel 5 has, at quadrants along its perimeter, outwardly radially projecting integral tabs 7, upon which consonants 8 are removably mounted.

In the illustrative embodiment, the wheel 5 is spaced axially from the board for a distance sufficient to permit the tabs 7 to clear the phonic word family 3. The phonic word family station 2 can be defined by a piece of felt, or it may be a part of a broad covering of felt, and the phonic word family can be made of felt also, and mounted in the manner of indicia on felt-boards. The tabs 7 can also be covered with felt and the consonants 8 be made of felt so that the consonants can be readily mounted and demounted.

Referring now to FIGURES 1–4 for a more elaborate embodiment of educational device of this invention, which is suitable for permanent installation for school room use, reference numeral 101 indicates a board provided with hanging brackets 111, by which the device can be mounted on a wall. The board 101 has a phonic word family station 102 in the form of an aperture in its upper edge area. The board 101 also has an information station 112 in the form of an aperture in its lower edge area which, in the illustrative embodiment, is shown larger than normally required or desirable, merely for clarity of illustration. The board 101 also has an access bay 114 cut out of a vertical edge.

A phonic word family and information carrier disc 120 is mounted at its center for rotation on a pin 106, which is mounted in and extends through the board 101. The carrier disc 120 has a series of phonic word families 123 spaced along approximately one-half of its circumference, and a series of information panels 124 spaced along the other half, each of the phonic word families having a corresponding information panel located 180° from it as shown particularly in FIGURE 3.

In front of the board 101, a consonant carrier wheel 105 is rotatably mounted at its center on the pin 106. A washer 110, interposed between the board 101 and the carrier 105, serves a double function. It spaces the wheel 105 from the board 101, and provides a smaller frictional surface than the one between the carrier disc 120 and the board 101. The spacing between the consonant carrier wheel 105 and the board 101 is sufficient to accommodate one of two legs 119 defining sides of a channel 129 in a consonant tab 117. The consonant tab 117 carries a consonant 128 which may be embossed in or painted on the tab 117. The channel 129 is of a width and the tab 117 is of a material such that legs 119 grip the edge area of the carrier wheel 105 hard enough to remain firmly in position in use, but not so firmly as to prevent their removal and replacement. The facing outer edges of the legs 119 can be chamfered to make their installation easier.

In the operation of the embodiment of the device shown in FIGURES 1–3, the device is preferably mounted on a wall at a height at which students in a classroom can see easily the phonic word family station and consonant display. The phonic word family carrier disc 120 is then turned manually, at the bay 114, until the desired phonic word family apears in the aperture of the station 102. The information which automatically appears in the information station is the identity of consonants which, taken together with the displayed phonic word family, will form suitable words. The teacher then chooses as many different consonants as he desires, preferably four, and mounts them at spaced intervals about the perimeter of the consonant carrier wheel 105. The attention of the students is then called to the device, and the consonant carrier wheel rotated. As consonants approach the phonic word family station, the students can anticipate what word is going to be spelled. The movement of the wheel 105 can be either continuous or intermittent, but preferably, it is not long interrupted. With a single phonic word family station and no more than four consonants, the attention of almost all school age children, and many preschool age children, can be kept long enough to teach them the association of the consonants on the wheel with one phonic word family.

Numerous variations in the construction of the educational device of this invention within the scope of the appended claims will occur to those skilled in the art in the light of the foregoing disclosure.

For example in the first embodiment described, the consonants and the phonic word families may be mounted on the wheel tabs and board respectively by means of some tacky material or mechanically by snaps or clips. Similarly, the wheel of the second embodiment may be equipped with spring clips or peripheral slots or some other holding means, and the tabs 117 can be modified accordingly, to permit their mounting. Other access arrangements for the moving of the carrier disc 120 can be provided. The information station may be located radially inwardly from the phonic word family station, which would permit phonic word families to be arranged through the entire circumference of the carrier disc 120, while the information areas would be radially inboard of the phonic word families. Again, the phonic word family station and the information station can be located with a different angular relation to one another. Thus, for example, the bay 114 might be utilized as an information station, the information being printed radially outboard of the phonic word families. Various handles or other aids to moving of the wheel 105 may be provided. It can even be motor driven if desired. In either embodiment, the pivot pin may have a spring washer on it to load the pin axially and regulate and prolong the frictional enagement of the relatively moveable elements. A linear consonant carrier such as an endless belt, could be used, although the exposure, simplicity and axial compactness of the wheel are advantages. A masking element, either fixed or movable, can be provided to mask the consonant after it leaves the position at which it has formed a word or through a part of its travel as it approaches the station. The phonic word family station could be made to project over the consonant carrier tab path rather than being set behind the carrier, especially in the embodiment shown in FIGURE 5. The board can be made in the form of an envelope of cardboard or heavy paper, for cheaper, lighter models, with the phonic word family carrier journaled inside. The consonants themselves may be made of material of sufficient stiffness as to be self-supporting, and mounted to project from the consonant carrier wheel. These are merely illustrative.

Having thus described the invention, what is claimed and desired to be secured by Letters Patent is:

1. An educational device comprising a phonic word family station, a phonic word family displayed at said station, a movable consonant carrire wheel mounted at its center for rotation relative to the phonic word family station, said wheel carrying a plurality of circumferentially spaced radially outwardly projecting consonant tabs displaying consonants, and being arranged to move adjacent said phonic word family station, whereby rotation of said wheel moves successive consonants into position to form a word with said phonic word family, said tabs being spaced a sufficient distance apart along said wheel to remain unobtrusive as said wheel moves any one consonant into position and said successive consonants being exposed to view as they approach the phonic word family station through a substantial distance of travel.

2. The device of claim 1 wherein the wheel has only four, quadrantly located tabs.

3. The device of claim 1 wherein the phonic word family station is faced with felt, the consonant tabs are faced with felt, and the consonants and phonic word families are made of felt.

4. The device of claim 1 wherein the tabs are selectively mountable on and demountable from said consonant carrier wheel.

5. An educational device comprising a phonic word family station defined by an aperture in a board, said board having an information station at a fixed angular and spaced relation to the phonic word family station, a phonic word family carrier disc mounted for rotation on the board and behind the board, phonic word families positioned on said phonic word family carrier disc to be selectively displayed through said aperture, information carried by the phonic word family carrier disc at positions angularly and spacedly related to each phonic word family similarly to the relation of the word family station and information station of said board, whereby when a phonic word family is displayed at the phonic word family station, the information on the carrier disc is displayed at the information station, a consonant carrier wheel mounted at its center for rotation on said board relative to the phonic word family station and having a part adjacent said station, and a plurality of consonants displayed in spaced relation on said consonant carrier wheel whereby rotation of said wheel moves said consonants successively into position to form a word with said phonic word family, said consonants being spaced a sufficient distance apart along said carrier to remain unobtrusive as said consonant carrier moves any one consonant into position and said successive consonants being exposed to view as they approach the phonic word family station through a substantial distance of travel.

6. The device of claim 5 wherein the consonants are selectively mountable on and demountable from said consonant carrier wheel.

References Cited

UNITED STATES PATENTS

| | | |
|---|---|---|
| 1,019,541 | 3/1912 | Southworth. |
| 1,049,997 | 1/1913 | Coe _____ 35—74 |
| 2,369,804 | 2/1945 | Schoolfield et al. _____ 35—35 |
| 2,938,282 | 5/1960 | Spielman. |
| 3,200,517 | 8/1965 | D'Agostino. |

EUGENE R. CAPOZIO, Primary Examiner

WILLIAM H. GRIEB, Assistant Examiner

U.S. Cl. X.R.

35—74

UNITED STATES PATENT OFFICE
CERTIFICATE OF CORRECTION

Patent No. 3,460,273                                            August 12, 1969

Johnye G. Boyd

It is certified that error appears in the above identified patent and that said Letters Patent are hereby corrected as shown below:

Column 4, line 42, "carrire" should read -- carrier --.
Column 6, line 4, "1,019,541" should read -- 1,019,545 --.

Signed and sealed this 11th day of August 1970.

(SEAL)
Attest:

Edward M. Fletcher, Jr.                        WILLIAM E. SCHUYLER, JR
Attesting Officer                                Commissioner of Patents